June 21, 1938.  J. S. COE ET AL  2,121,558
METHOD OF INSTALLING A TUBULAR SYSTEM
Filed June 3, 1936  2 Sheets-Sheet 1
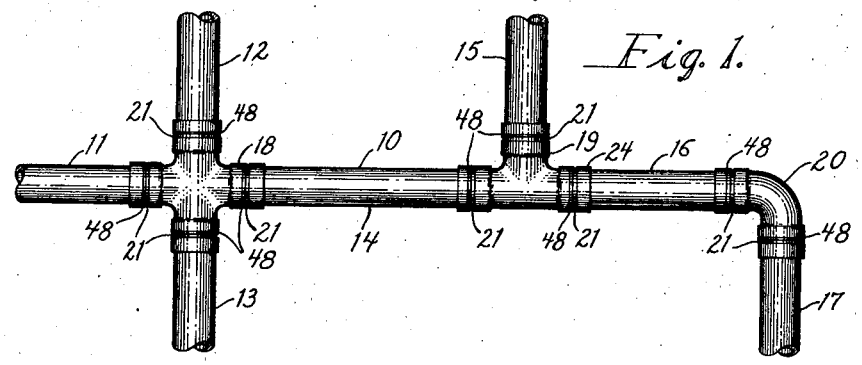
Fig. 1.
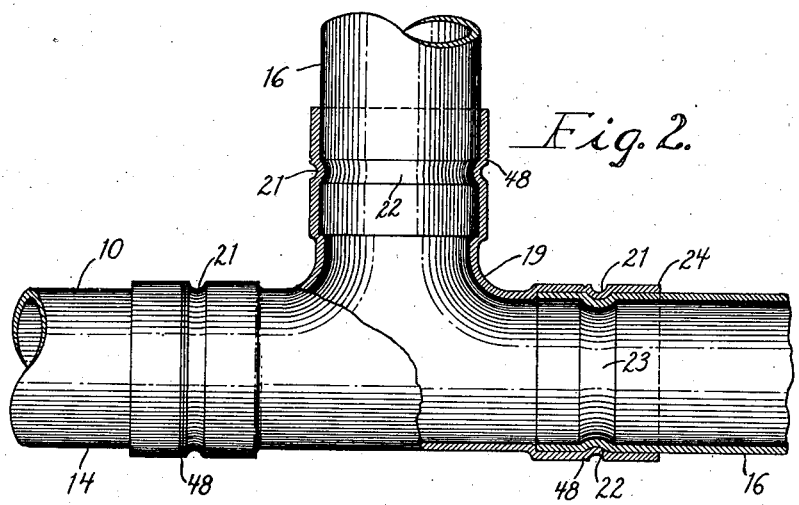
Fig. 2.
Fig. 3.
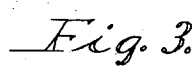
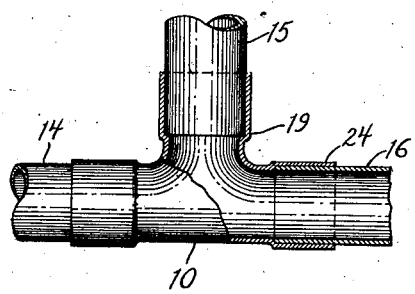
Fig. 4.
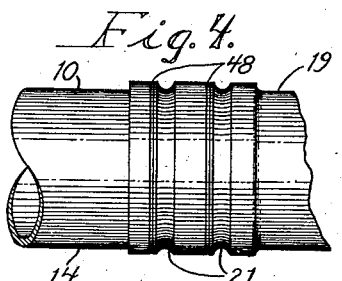
Inventors
John S. Coe
William M. Mulholland
By Seymour Earle Nichols
Attorneys June 21, 1938.  J. S. COE ET AL  2,121,558
METHOD OF INSTALLING A TUBULAR SYSTEM
Filed June 3, 1936   2 Sheets-Sheet 2
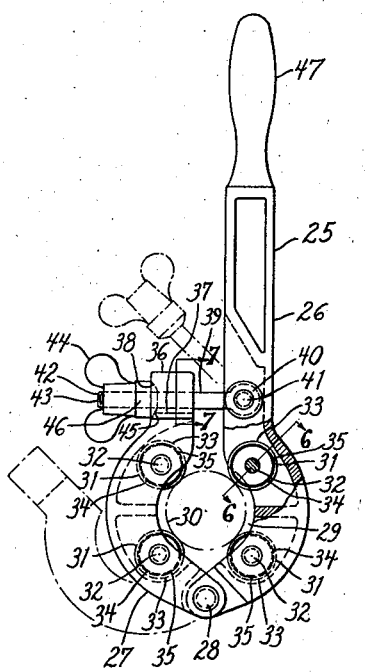
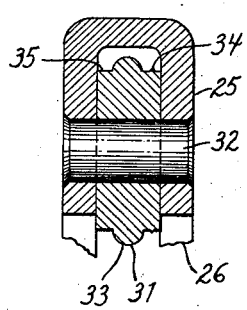
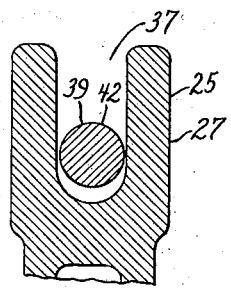
Inventors
John S. Coe
William M. Mulholland
By Seymour Earle & Nichols
Attorneys Patented June 21, 1938

2,121,558

UNITED STATES PATENT OFFICE 2,121,558

METHOD OF INSTALLING A TUBULAR SYSTEM

John S. Coe and William M. Mulholland, Waterbury, Conn., assignors to The Chase Companies, Incorporated, Waterbury, Conn., a corporation of Connecticut Application June 3, 1936, Serial No. 83,198

1 Claim. (Cl. 29—157)

This invention relates to improvements in installation of tubular systems, and more particularly, installations of telescopically-connected fittings and tubes forming fluid-transmitting systems.

One object of this invention is to provide an improved installation of telescopically-connected fittings and tubes forming a fluid-transmitting system which will not come apart even if the temperature of the fittings and tubes rises above the melting-point of solder used for sweating the tubes and fittings together.

Another object of this invention is to provide an improved installation of telescopically-connected fittings and tubes forming a fluid-transmitting system which need not depend on solder either for maintaining the connections fluid-tight or for holding the parts together.

Another object of this invention is to provide an improved method of installing the foregoing mentioned systems.

With the above and other objects in view, this invention includes all improvements over the prior art which are disclosed in this application.

In the accompanying drawings in which certain ways of carrying out the invention are shown for illustrative purposes:

Fig. 1 is a fragmental side elevation of a tubular system installed in accordance with this invention;

Fig. 2 is an enlarged view, partly in section, of a portion of Fig. 1;

Fig. 3 is a view similar to Fig. 2 prior to pressing or rolling-in the grooves;

Fig. 4 is a fragmental view of a modified construction;

Fig. 5 is a side elevation, partly in section, of a tool for rolling-in the grooves to lock the telescopically-interfitting fittings and tubes together;

Fig. 6 is a sectional view on line 6—6 of Fig. 5; and

Fig. 7 is a sectional view on line 7—7 of Fig. 5.

In the description and claim, the various parts and steps are identified by specific names for convenience, but they are intended to be as generic in their application as the prior art will permit.

Referring to Figs. 1 to 4 inclusive of the drawings, the tubular system or installation 10 includes a plurality of tubes or pipes 11, 12, 13, 14, 15, 16, 17 having telescopically-interfitting connections with fittings 18, 19, 20. The particular fittings 18, 19, 20 illustrated are respectively a cross, T and elbow, but any other forms of fittings may be employed, such for example as couplings, Y's, etc.

The fittings and tubes may be made of any suitable malleable metal. Copper and copper alloys are metals particularly suitable for the purpose. The fittings and tubes may be installed in any desired arrangement to form systems for various purposes, including refrigeration and sprinkler systems.

According to one method of installation, the telescopically-interfitting fittings and tubes may first be sweated together with solder in any known manner. Next, depressions, such for example as annular grooves 21, are pressed or rolled into the outer of the telescopically-overlapping parts of the fittings and tubes. The annular grooves 21 are preferably rolled to a depth sufficient to produce an annular groove 22 and an inner annular bulge 23 in the inner member, which inner member in the drawings is illustrated as the tube, although it will be appreciated that the tube could be of a size to fit over the outside of the tubular end 24 of the fitting instead of inside, if so desired, in which case the outermost annular groove would be formed in the tube and the inner groove in the tubular end of the fitting. By this rolling of the superposed grooves 21 and 22 in the overlapping parts of the fittings and tubes, the fittings and tubes are securely locked against any possible separation or coming apart, which otherwise could readily occur in case of fire melting the solder of the sweat-joints, if the tubular installation formed part of a refrigeration or sprinkler system, for example, especially where gaseous fluids were present in the tubular system or in part thereof, since gases in the tubular system would not aid much in maintaining the system at a temperature below the melting-point of the solder, during a fire.

Instead of performing the sweating operation first, it may be performed after the groove rolling-in operation has been performed. Or, if the groove rolling-in operation is performed with care, gas-tight joints can be made without the use of any solder.

Instead of depending on a single rolled-in groove, a plurality of grooves 21 may be rolled in a pair of telescoped overlapping parts, shown in Fig. 4.

For accomplishing the groove rolling-in operations, a grooving or beading-tool such as shown in Figs. 5, 6 and 7 may be used. This tool 25 has a pair of supporting-members 26, 27, pivoted together at 28 and so shaped as to provide a central opening 29 adapted to accommodate a telescoped fitting and tube which is diagrammatically illustrated by the broken line circle 30. Each of the supporting-members 26, 27 carries a pair of rollers 31 pivoted at 32. Each roller 31 is preferably of tool steel and preferably has a blunt annular flange or bead 33 forming its outer periphery. Each roller also may have suitable marking-means, which in the form shown in the drawings, is a V-shape annular marking-flange 34, the size of which in the drawings is shown greatly enlarged for clearness, as this marking-flange 34 could have a height of .005″ more or less above the cylindrical surface 35 of the roller. Any other suitable form of marking-means could be employed in place of the annular marking-flange if so desired. For example, knurling could be used or separate small projections could be used, and whatever marking-means is employed, could be located on only one of the rollers, if so desired. The center planes of the annular beads 33 of all the rollers will preferably lie in the same plane.

The upper end 36 of the supporting-member 27 is provided with an open-end slot 37 and with a concave seat 38 in its front face. A bolt 39 has an eye 40 pivoted at 41 to the supporting-member 26. The shank 42 of the bolt 39 can swing into and out of the open-end slot 37, and has its outer end 43 threaded into a wing-nut 44, which wing-nut serves to press the convex face 45 of the washer 46 against the concave seat 38 of supporting-member 27. A handle 47 is provided on the free end of supporting-member 26.

Operation: After one or more fittings and tubes have been placed in telescoped interfitting relationship, with or without sweating the parts together, the bolt 39 of the tool 25 is swung up out of the slot 37, whereupon the supporting-member 27 is swung open about its pivot 28 to permit the interfitting fitting-and-tube construction represented by the broken circle 30 to be placed within the central opening 29, whereupon the bolt 39 is again swung into the slot 37 and the wing-nut 44 is threaded up to tighten the convex face 45 of the washer 46 against the concave seat 38 of the supporting-member 27, thus bringing the annular beads 33 of the rollers 31 tightly into engagement with the outer cylindrical surface of the outer of the parts indicated diagrammatically at 30.

By grasping the handle 47 and giving a back-and-forth rocking action to the tool through an arc of 90° or more, a shallow complete annular groove will be rolled into the outer surface of the outer member indicated at 30. Then the wing-nut 44 is tightened up further, and the back-and-forth rocking action is repeated to thus deepen the annular rolled-in groove. The tightening of nut 44 and the rolling-in action is repeated as often as necessary until the rolled-in groove 21 (Figs. 1, 2 and 4) is of the desired depth, which preferably is when a groove 22 (Fig. 2) is also rolled into the inner of the telescoping overlapping parts.

By having a marking-means of small height such as the annular marking-flange 34, an annular mark 48 will be formed adjacent the annular groove 21, when, and only when, the workman has rolled the groove 21 to the proper depth to properly join the parts.

By the use of the rolled-in grooves 21, the fittings and tubes are securely connected together in a way readily subject to inspection from the outside of the connections by fire underwriters or others. And when marking-means such as the marking-grooves 48 are also employed, this serves as important visual evidence that the rolling-in operation has been adequately performed.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

We claim:

The method of installing a fluid-transmitting tubular system, comprising: telescopically interfitting an unthreaded malleable-metal fitting-member and an unthreaded malleable-metal tube-member; then pressing inwardly by circumferential roller action an outer circumferential portion of the outer of the two said telescopically-interfitting members to concurrently form an outer circumferential groove and an inward circumferential projection on both of the said members to lock the same against axial separation; and then, at substantially the completion of the said inward-pressing interlocking action, pressing inwardly upon the outer surface of the outer of the two said telescopically-interfitted members at a point displaced axially with respect to the said circumferential grooves on the said members, to form a separate gauge-mark of distinctly-different character from the adjacent circumferential groove on the surface of the said outer member.

JOHN S. COE.
WILLIAM M. MULHOLLAND.